United States Patent
Sakaguchi et al.

(10) Patent No.: US 11,097,365 B2
(45) Date of Patent: Aug. 24, 2021

(54) WIRE ELECTRIC DISCHARGE MACHINING DEVICE

(71) Applicant: Sodick Co., Ltd., Kanagawa (JP)

(72) Inventors: Masashi Sakaguchi, Kanagawa (JP); Kohei Matsuura, Kanagawa (JP); Hirotoshi Inoue, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 335 days.

(21) Appl. No.: 16/252,580

(22) Filed: Jan. 19, 2019

(65) Prior Publication Data
US 2019/0232407 A1    Aug. 1, 2019

(30) Foreign Application Priority Data

Jan. 31, 2018  (JP) .............................. JP2018-015883

(51) Int. Cl.
*B23H 7/10*     (2006.01)
*B23H 7/20*     (2006.01)
(Continued)

(52) U.S. Cl.
CPC .............. *B23H 1/024* (2013.01); *B23H 7/10* (2013.01); *B23H 7/104* (2013.01); *G05B 19/4065* (2013.01); *G05B 2219/45043* (2013.01)

(58) Field of Classification Search
CPC .......... B23H 1/024; B23H 7/10; B23H 7/104; B32H 7/20; B65H 63/086; G05B 19/4065; G05B 2219/45043
See application file for complete search history.

(56) References Cited

U.S. PATENT DOCUMENTS 4,748,310 A * 5/1988 Aso .................... B23H 7/10
                                                   219/69.12
4,998,003 A  3/1991 Kawanabe
(Continued)

FOREIGN PATENT DOCUMENTS

CN    101134258    3/2008
JP    S56126534    10/1981
(Continued)

OTHER PUBLICATIONS

"Office Action of China Counterpart Application", dated Oct. 10, 2020, with English translation thereof, p. 1-p. 15.
(Continued)

*Primary Examiner* — Geoffrey S Evans
(74) *Attorney, Agent, or Firm* — JCIPRNET (57) ABSTRACT

The wire electric discharge machining device includes a wire bobbin configured to wind and hold a wire electrode, a wire delivery roller configured to draw the wire electrode from the wire bobbin and deliver the wire electrode continuously toward a work-piece, a brake motor configured to apply a load to the wire bobbin in a direction against the drawing of the wire electrode, rotation speed detector configured to detect a rotation speed of the wire bobbin, an emptiness determination device configured to determine that the wire bobbin reaches an empty state based on a rapid change in the rotation speed of the wire bobbin detected by the rotation speed detector, and a drive control part configured to stop the drive of the wire delivery roller when the emptiness determination device determines that the wire bobbin reaches the empty state.

7 Claims, 7 Drawing Sheets

(51) Int. Cl.
*B23H 1/02* (2006.01)
*G05B 19/4065* (2006.01)

(56) References Cited

U.S. PATENT DOCUMENTS

| | | |
|---|---|---|
| 10,646,939 B2 | 5/2020 | Nakagawa et al. |
| 2006/0070987 A1* | 4/2006 | Daniel .................... B23K 9/12 |
| | | 219/137.71 |
| 2008/0053963 A1* | 3/2008 | Kita ....................... B23H 7/104 |
| | | 219/69.12 |
| 2011/0226885 A1* | 9/2011 | Fries ....................... B21C 49/00 |
| | | 242/420 |
| 2014/0131002 A1* | 5/2014 | Dussud ................ G01B 21/085 |
| | | 164/151.2 |
| 2015/0202701 A1 | 7/2015 | Hara |
| 2019/0337070 A1* | 11/2019 | Nakagawa ............. B23H 11/00 |

FOREIGN PATENT DOCUMENTS

| | | |
|---|---|---|
| JP | H02116421 | 5/1990 |
| JP | 2510109 | 9/1996 |
| JP | 2003025155 | 1/2003 |
| JP | 6239200 | 11/2017 |

OTHER PUBLICATIONS

"Office Action of Japan Counterpart Application", dated Jul. 1, 2020, with English translation thereof, pp. 1-6.

Office Action of China Counterpart Application, with English translation thereof, dated Mar. 17, 2021, pp. 1-14.

\* cited by examiner

WIRE ELECTRIC DISCHARGE MACHINING DEVICE

CROSS REFERENCE TO RELATED APPLICATION

The disclosure claims priority under 35 U.S.C. § 119 to Japanese Application No. 2018-015883 filed on Jan. 31, 2018. The entire content of which is incorporated herein by reference.

BACKGROUND

Technical Field

The disclosure is related to a wire electric discharge machining device, in particular the wire electric discharge machining device that has a function of detecting the empty state of a wire bobbin which winds and holds a wire electrode.

Description of Related Art

In a wire electric discharge machining device that uses a wire bobbin winding and holding a wire electrode, in order to appropriately grasp the timing to replace the wire bobbin with a new one, a residual quantity of the wire electrode in the wire bobbin should be accurately detected. Then, very often, if it is detected that the residual quantity of the wire electrodes being detected becomes 0 (zero), that is, the wire bobbin is in an empty state, the delivery of the wire electrode should be stopped there. The reason is that if the delivery of the wire electrode continues after the wire bobbin is in the empty state, a rear end of the wire electrode may enter a machining clearance of a work-piece and damage a machining surface of the work-piece. Besides, the reason is that if the delivery of the wire electrode continues after the wire bobbin is in the empty state, even before the rear end of the wire electrode enters the machining clearance of the work-piece, the rear end of the wire electrode passes through a means that applies tension (tensile force) to the wire electrode. Accordingly, there is also concern that the tension applied to the wire electrode is lower than the tension in the machining and the machining surface of the work-piece is damaged because of the wire electrode which shakes slightly. Although when the aforementioned damage is made during a comparatively rough wire electric discharge machining to the machining surface of the work-piece, the damage may be eliminated by a following finer wire electric discharge machining (for example, intermediate machining, finishing machining and the like), the damage is often inevitable in the finishing machining and the like.

As the related art that corresponds to the aforementioned requirement, a wire electric discharge machining device, which has a function of calculating the residual quantity of the wire electrode in the wire bobbin to calculate the position in the midway of machining where the wire bobbin reaches an empty state, is disclosed in patent document 1 for example. Besides, in patent document 2, a wire electric discharge machining device is disclosed which has a function of calculating the residual quantity of the wire electrode in the wire bobbin to stop the delivery of the wire electrode in a machining process before the wire bobbin reaches an empty state.

RELATED ART LITERATURE

Patent Documents

Patent Document 1: Japanese Laid-Open No. 2003-25155
Patent Document 2: US2015202701

However, in the aforementioned existing wire electric discharge machining device, because the delivery of the wire electrode is stopped before the wire bobbin reaches the empty state, the wire electrode remains in the wire bobbin when the delivery is stopped. If this wire bobbin is replaced by a new one, the remaining wire electrode is wasted. When the delivery of the wire electrode is stopped while a longer wire electrode still remains for the sake of safety to avoid the empty state of the wire bobbin, waste of the wire electrode becomes more evident.

SUMMARY

The wire electric discharge machining device according to an embodiment of the disclosure includes a wire bobbin configured to wind and hold a wire electrode, a wire delivery means configured to draw the wire electrode from the wire bobbin and deliver the wire electrode continuously toward a work-piece, and a load applying means configured to apply a load to the wire bobbin in a direction against the drawing of the wire electrode, and further includes: a rotation speed detection means configured to detect a rotation speed of the wire bobbin; an emptiness determination means configured to determine that the wire bobbin reaches an empty state based on a rapid change in the rotation speed of the wire bobbin detected by the rotation speed detection means; and a drive control part configured to stop the drive of the wire delivery means when the emptiness determination means determines that the wire bobbin reaches the empty state.

DESCRIPTION OF THE EMBODIMENTS

Figure 1:
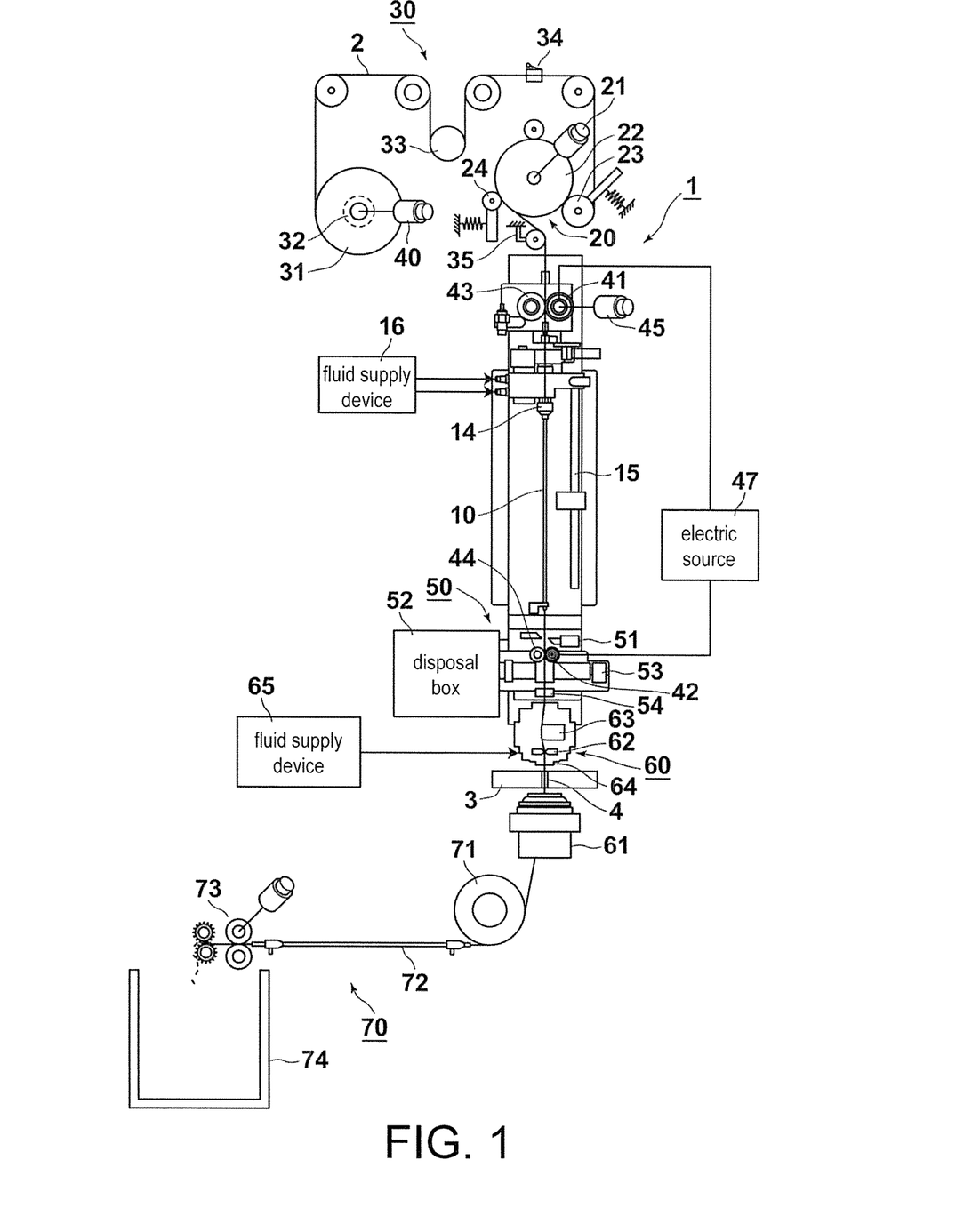
FIG. 1 is a schematic configuration diagram showing a wire electric discharge machining device according to one embodiment of the disclosure.
Figure 2:
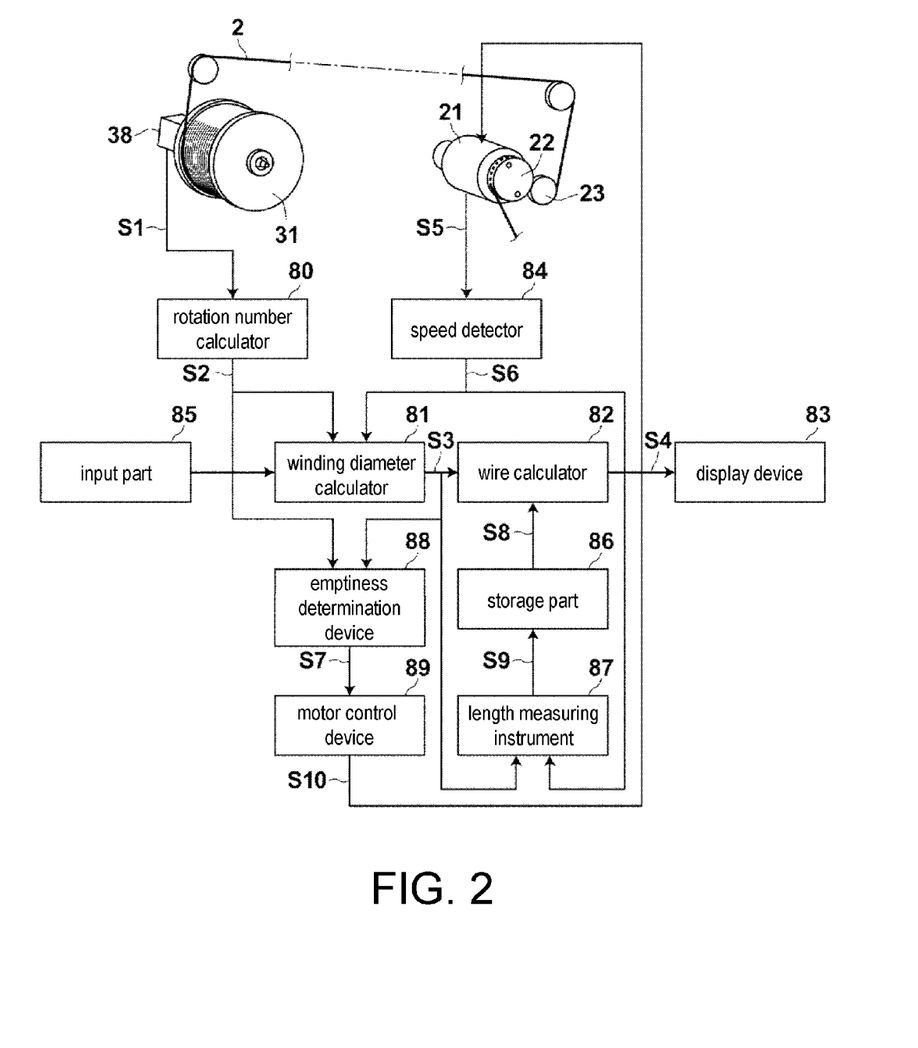
FIG. 2 is a block diagram showing a main electrical configuration of the wire electric discharge machining device.

Embodiments of the disclosure are described below in detail with reference to the diagrams. FIG. 1 is a diagram showing a schematic configuration of a wire electric discharge machining device according to one embodiment of the disclosure. In addition, FIG. 2 is a diagram showing a main electrical configuration of the wire electric discharge machining device. First, an overall configuration of the wire electric discharge machining device is described with reference to FIG. 1.

The wire electric discharge machining device shown in FIG. 1 is provided with an automatic wire connection device 1, a supply mechanism 30 configured to continuously supply wire electrodes 2 to a machining site of a work-piece 3, and a discharge mechanism 70 configured to collect the used wire electrode 2 from the machining site of the work-piece 3. The automatic wire connection device 1 is a means that automatically inserts the wire electrode 2 into a pilot hole 4 formed in the work-piece 3. Moreover, the unused wire electrode 2 is wound and held on a wire bobbin 31. The wire electrode 2 drawn from the wire bobbin 31 is fed in the sequence of the supply mechanism 30, the automatic wire connection device 1, and the discharge mechanism 70.

The supply mechanism 30 continuously supplies the unused wire electrode 2 to the machining site. The supply mechanism 30 includes: a reel 32 that has a brake motor 40 which applies a load in a direction against the drawing of the wire electrode 2 to the wire bobbin 31 so that a so-called back tension is applied to the wire electrode 2; a servo pulley 33 that prevents changes in the tension of the wire electrode 2; a delivery roller 20 that draws and delivers the wire electrode 2 from the wire bobbin 31 and applies a tension; a wire-disconnection detector 34 that consists of a limit switch and the like and detects the disconnection of the wire electrode 2; and a tension detector 35 that consists of a strain gauge and the like and detects the tension of the wire electrode 2. The wire electrode 2 drawn from the wire bobbin 31 passes by the servo pulley 33 and the delivery roller 20 and reaches the automatic wire connection device 1. In this embodiment, a load applying means that applies the load in a direction against the drawing of the wire electrode 2 to the wire bobbin 31 is formed by the brake motor 40.

The delivery roller 20 forming a wire delivery part is formed by a driving roller 22 rotating forward and backward due to the servo motor 21, and pinch rollers 23, 24 that press the wire electrode 2 following the driving roller 22. As an example, the roller section of the pinch roller 23 consists of ceramic and the roller part of the pinch roller 24 consists of rubber. In this embodiment, the wire delivery means that draws the wire electrode 2 from the wire bobbin 31 and continuously delivers the wire electrode 2 to the work-piece 3 is formed by the wire delivery part.

The automatic wire connection device 1 has a pair of energization electrodes 41, 42 that supplies a heating electric current to the wire electrode 2 to which the tension is applied, a guide pipe 10 that is arranged between the pair of energization electrodes 41, 42 and guides the wire electrode 2, and a fluid supply device 16 that is arranged on the supply mechanism 30 side of the guide pipe 10 and supplies fluid into the guide pipe 10.

The energization electrode 41 is also used as a forward/backward rotation roller that delivers or winds the wire electrode 2. That is, the energization electrode 41 formed into a roller shape rotates forward and backward due to the motor 45 that is connected, pinches the wire electrode 2 in the space between the energization electrode 41 and a pinch roller 43 disposed in opposition and delivers the wire electrode 2 in the forward and backward directions. On the other hand, the energization electrode 42 holds the wire electrode 2 in the space between the energization electrode 42 and a pinch roller 44 disposed in opposition. The energization electrode 41 and pinch roller 43 are disposed on the supply mechanism 30 side pinching the guide pipe 10 and the energization electrode 42 and the pinch roller 44 are disposed on the discharge mechanism 70 pinching the guide pipe 10.

The pair of energization electrodes 41, 42 is connected to an energization electric source 47 and supplies a heating electric current to the wire electrode 2. At this time, a tension weaker than the tension in the machining and unable to break the wire electrode 2 is applied to the wire electrode 2. The heating electric current and the tension are set in accordance with the wire diameter or material of the wire electrode 2. The heating electric current supplied from the energization electric source 47 can be changed by changing a resistance value of the energization electric source 47. Besides, the tension of the wire electrode 2 between the pair of energization electrodes 41, 42 can be changed by changing the torque of the servo motor 21.

The guide pipe 10 is disposed between the energization electrode 41 and an upper wire guide 62 described later. The guide pipe 10 is lifted and lowered by a lifting device 15 operated by an actuator. When automatic wire connection is not performed, the guide pipe 10 is lifted to an upper limit position and stopped. When the wire electrode 2 is inserted into the pilot hole 4, the guide pipe 10 is lowered at least to a position right above the upper wire guide 62 in accordance with the delivery of the wire electrode 2 and guides the wire electrode 2 to the upper wire guide 62. The guide pipe 10 is fastened and mounted by a cap 14 to a vertical movement member (not shown) that is supported on a body side of the automatic wire connection device 1.

The fluid supply device 16 is a compressed air supply device for example and includes an unillustrated compressed air supply source such as an air compressor and a regulator. When this configuration is achieved, the fluid supplied from the fluid supply device 16 is compressed air. The fluid supply device 16 adjusts the high-pressure compressed air of the compressed air supply source to a predetermined pressure by the regulator during the automatic wire connection and supplies the compressed air into the guide pipe 10. In this way, the fluid supply device 16 generates a descending air flow heading to the discharge mechanism 70 to deliver the wire electrode 2 along a travelling path downward, i.e. to the discharge mechanism 70 side, and make the wire electrode 2 move straight forward.

The automatic wire connection device 1 also has a tip processing device 50 that cuts off and disposes of a rough tip of the wire electrode 2. The tip processing device 50 includes a cut-off device 51 that cuts off the wire electrode 2, a disposal box 52 that collects the cut-off pieces of the wire electrode 2 which are cut off by the cut-off device 51 and become useless, a clamp unit 53 that grips the cut-off pieces of the wire electrode 2 and conveys them to the disposal box 52, and a tip detector 54 that detects the tip of the wire electrode 2.

Besides, the wire electric discharge machining device is provided with an upper guide assembly 60 and a lower guide assembly 61. The upper guide assembly 60 provided on the upper side, i.e. the supply mechanism 30 side of the work-piece 3 is a unit formed by integrally incorporating the upper wire guide 62, an upper energization body 63 and a machining fluid jetting nozzle 64 into a housing. In addition, the lower guide assembly 61 provided on the lower side, i.e. the discharge mechanism 70 side of the work-piece 3 is a unit formed by integrally incorporating an unillustrated lower wire guide, lower energization body and machining fluid jetting nozzle into a housing. The upper wire guide 62 and lower wire guide locate and guide the wire electrode 2 to a position as close to the work-piece 3 as possible. The upper energization body 63 and the lower energization body supplies an electrical current used for discharge machining to the wire electrode 2.

Furthermore, in the wire electric discharge machining device, a high pressure machining fluid supply device 65 that supplies high pressure discharge machining fluid are provided in chambers of the machining fluid jetting nozzle 64 of the upper guide assembly 60 and the machining fluid jetting nozzle of the lower guide assembly 61. The high pressure machining fluid is selectively supplied from the high pressure machining fluid supply device 65 to the chambers of the machining fluid jetting nozzles as necessary. The machining fluid jet with a predetermined pressure stored in the chamber is jetted coaxially relative to a travelling path axis of the wire electrode 2 from the machining fluid jetting nozzle toward the machining clearance, i.e. the pilot hole 4 of the work-piece 3. In this way, the wire electrode 2 is inserted into the pilot hole 4 while being controlled by the machining fluid jet.

The discharge mechanism 70 collects, from the machining site, the used wire electrode 2 that is supplied to the machining of the work-piece 3 and consumed. The discharge mechanism 70 includes an idling roller 71 that gives offset to the travelling path of the wire electrode 2 stretched vertically in the work-piece 3 and transfers a proceeding direction of the delivered wire electrode 2, a convey device 72 that conveys the wire electrode 2 by fluid, a winding roller 73 that winds the wire electrode 2, and a bucket 74 that collects the used wire electrode 2.

In the wire electric discharge machining device having the configuration mentioned above, discharge is generated in the machining fluid in the machining clearance (the pilot hole 4) between the wire electrode 2 which is energized from the upper energization body 63 and the lower energization body and the work-piece 3 which is energized via an energization body outside the diagram, and thus the work-piece 3 is processed. At this moment, by relatively moving a table outside the diagram on which the work-piece 3 is placed with respect to the wire electrode 2, the work-piece 3 can be processed to a desired shape.

Moreover, when the stretched wire electrode 2 is intentionally cut off and inserted into a machining starting hole of the work-piece 3 anew, or when the wire electrode 2 encounters an unintended disconnection, the wire electrode 2 is automatically connected by the automatic wire connection device 1. For example, an existing publicly known approach disclosed in the Japanese Laid-open No. 2016-221654 and the like can be applied in the automatic connection done by the automatic wire connection device 1, and detailed description is omitted.

Next, a wire residual quantity detection device consisting of the configuration shown in FIG. 2 is described. Moreover, in FIG. 2, the electrical configuration is shown as a block diagram. Besides, in FIG. 2, outside the block diagram, a proximity sensor 38 described later is shown in addition to the servo motor 21, the driving roller 22, the pinch rollers 23, 24 and the wire bobbin 31 the same as those shown in FIG. 1.

Figure 3:
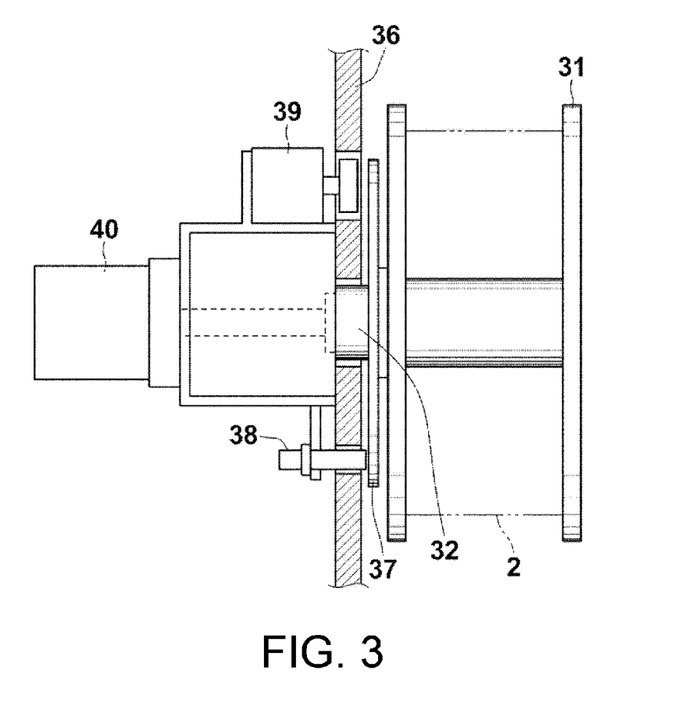
FIG. 3 is a partially broken side view showing a part of the wire electric discharge machining device.

Here, the configuration around the wire bobbin 31 is shown in FIG. 3. As shown in the diagram, the wire bobbin 31 is loaded in the reel 32 at the tip of rotation shaft that penetrates a bobbin holding plate 36 and rotatably kept, and is driven by the reel 32, to which the brake motor 40 is directly connected as described above, to rotate with a predetermined torque at the direction opposite to the direction in which the wire electrode 2 is delivered. Therefore, when there is no load on the wire bobbin 31, the wire bobbin 31 rotates backward at a predetermined rotation speed; but when the wire electrode 2 is delivered by the delivery roller 20 toward the machining clearance, a predetermined braking force is generated in the wire bobbin 31 and a back tension is applied to the wire electrode 2. A proximity sensor detection plate 37 that rotates integrally with the reel 32 is fixed to the reel 32 in a state of being coaxial with the rotation shaft of the reel 32. The proximity sensor detection plate 37 is, for example, a circular plate on which 15 through holes are uniformly arranged in a circumferential direction. A proximity sensor 38 arranged at a position facing the through holes of the proximity sensor detection plate 37 is mounted on the bobbin holding plate 36. The proximity sensor 38 is an induction sensor or an electrostatic capacitance sensor for example. Because the proximity sensor 38 generates a pulse signal every time the through holes arranged on the proximity sensor detection plate 37 pass a head-on position, 15 pulse signals are output in every one rotation of the wire bobbin 31. A mechanic bobbin brake 39 is mounted so as to clamp the bobbin holding plate 36 to face the through holes, and a stopper can be embedded into the through holes to temporarily stop, as necessary, the rotation of the wire bobbin 31 that rotates backward due to the brake motor 40 when there is no load.

Back to FIG. 2 for description, the wire residual quantity detection device is basically formed by the proximity sensor 38, a rotation number calculator 80 to which pulse signals S1 output by the proximity sensor 38 are input, a winding diameter calculator 81 to which rotation speed signals S2 output by the rotation number calculator 80 are input, a wire calculator 82 to which winding diameter signals S3 output by the winding diameter calculator 81 are input, a display device 83 to which wire residual quantity signals S4 output by the wire calculator 82 are input, a speed detector 84 to which encoder pulses S5 of the servo motor 21 that rotates the driving roller 22 are input, an input part 85, and a storage part 86. The speed detector 84 detects the delivery speed of the wire electrode 2 based on the encoder pulses S5 and outputs wire delivery speed signals S6. The wire delivery speed signals S6 are input into the winding diameter calculator 81 and a length measuring instrument 87 described later. In this embodiment, a wire speed detection means that detects the delivery speed of the wire electrode 2 which is determined by the wire delivery means is formed by the speed detector 84.

In the configuration in FIG. 2, the length measuring instrument 87 connected to the storage part 86, an emptiness determination device 88 to which the rotation speed signals S2 output by the rotation number calculator 80 and the winding diameter signals S3 output by the winding diameter calculator 81 are input, and a motor control device 89 to which bobbin emptiness signals S7 output by the emptiness determination device 88 is input are also arranged.

Figure 4:
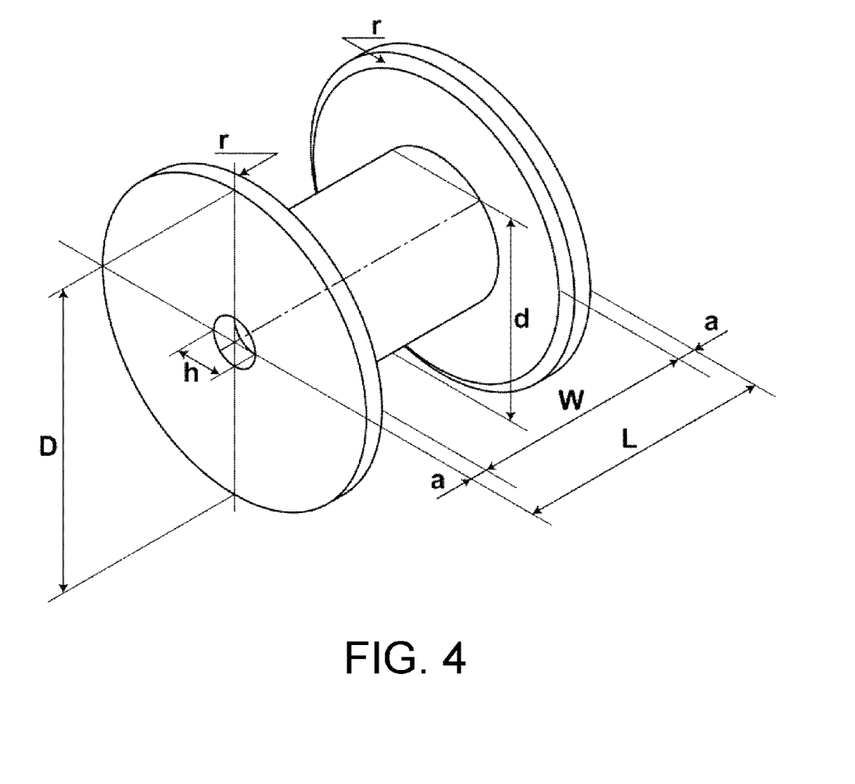
FIG. 4 is a perspective view showing a wire bobbin capable of being used in the wire electric discharge machining device.

Usually, the wire bobbin 31 has a plurality of standards and the one suitable for machining is selected from those wire bobbins 31 to be used during the discharge machining. Dimension examples of each part of the wire bobbin 31 in each of the plurality of standards are shown in table 1. Moreover, the dimensions such as flange diameter D and the like defined by each standard are the dimensions of the parts shown in FIG. 4.

TABLE 1

| Specification | Flange diameter D (mm) | Body diameter d (mm) | Internal width W (mm) | Shaft hole diameter h (mm) | Flange thickness a (mm) | Total length L (mm) | Flange r (mm) |
|---|---|---|---|---|---|---|---|
| P1 | 100 | 50 | 70 | 16 | 10 | 90 | |
| P3 | 130 | 60 | 90 | 20 | 12 | 114 | 1.5 |
| P5 | 160 | 90 | 90 | 20 | 12 | 114 | 1.5 |
| P5·RK | 160 | 110 | 90 | 20 | 12 | 114 | 1.5 |
| P10 | 200 | 110 | 110 | 25 | 12 | 134 | 5 |
| P20 | 250 | 110 | 110 | 32/34 | 15 | 140 | 4 |
| DP30 | 280 | 200 | 180 | 73 | 20 | 220 | 5 |
| DIN 160 | 160 | 100 | 160 | 22 | 16 | 160 | 3 |
| DIN 250 | 250 | 160 | 160 | 22 | 20 | 200 | 4 |

In addition, one kind of wire electrode 2 is selected from the wire electrodes 2 with mutually different external diameters ø of, for example, 0.05 mm, 0.1 mm, 0.2 mm and the like to be used as the wire electrode 2 that is wound on the wire bobbin 31. When the wire electrode 2 is wound on the wire bobbin 31, the relationship between the length (wire residual quantity S) of the wire electrode 2 being wound and the winding external diameter (wire winding diameter R) of the wire electrode 2 are uniquely determined by the body diameter d of the wire bobbin 31, the internal width W of the wire bobbin 31, and the external diameter ø of the wire electrode 2. In this embodiment, the body diameter d and the internal width W are the specifications of the wire bobbin 31 associated with the wire winding diameter R, and the external diameter ø is the specification of the wire electrode 2 associated with the wire winding diameter R.

Figure 5:
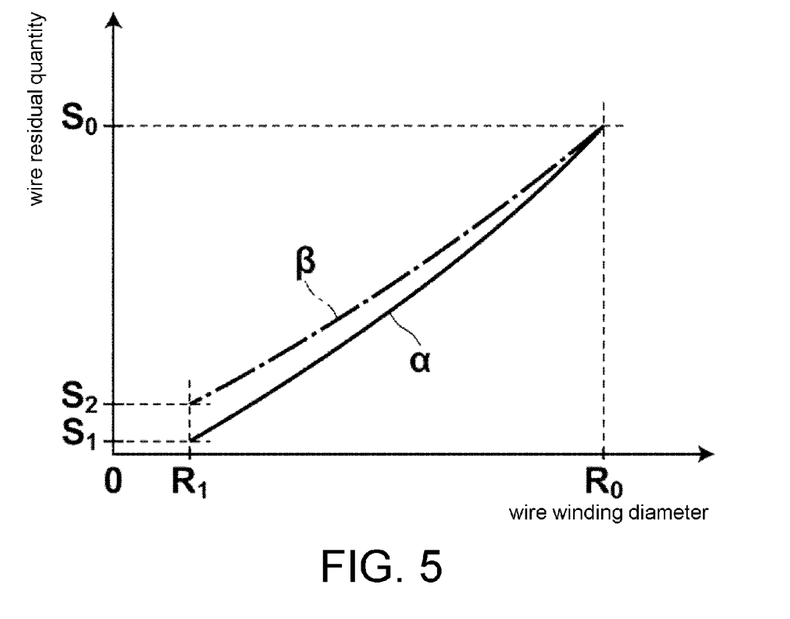
FIG. 5 is a graph showing an example of the relation between a wire winding diameter and a wire residual quantity of the wire bobbin.

The storage part 86 shown in FIG. 2 matches the relationship between the wire winding diameter R and the wire residual quantity S, which is practically measured for each specification of the wire bobbin 31 and the wire electrode 2 in a way described later, with the specification and stores the correspondence. In FIG. 5, two examples of the relationship between the wire winding diameter R and the wire residual quantity S are shown as α, β respectively.

Next, the detection of the wire residual quantity S performed during the wire electric discharge machining is described with reference to FIG. 2. Before starting the wire electric discharge machining, the specifications of the wire bobbin 31 and the wire electrode 2 to be used are input into the input part 85. The input is performed by inputting values of the body diameter d and the internal width W of the wire bobbin 31, and the external diameter ø of the wire electrode 2. Elsewise, because the body diameter d and the internal width W of the wire bobbin 31 are fixed in each standard of the wire bobbin 31 as shown in table 1, the input of the specification of the wire bobbin 31 may be indirectly performed by inputting the standard. The input specifications of the wire bobbin 31 and the wire electrode 2 are input through the winding diameter calculator 81 to the wire calculator 82.

When the wire electric discharge machining is performed, the wire electrode 2 is drawn from the wire bobbin 31 at a substantially fixed speed by the driving roller 22 forming the wire delivery part. Accordingly, because the wire bobbin 31 is rotating, the proximity sensor 38 constantly output the aforementioned pulse signals S1. The rotation number calculator 80 detects the rotation number, i.e. the rotation speed in a predetermined detection cycle of the wire bobbin 31 based on the pulse signals S1. In this way, in the embodiment, the rotation speed detection means that detects the rotation speed of the wire bobbin 31 is formed by the proximity sensor detection plate 37, the proximity sensor 38 and the rotation number calculator 80. The rotation number calculator 80 outputs the rotation speed signals S2 that represent the detected rotation speed of the wire bobbin 31, and the rotation speed signals S2 are input into the winding diameter calculator 81. In this embodiment, the rotation number calculation part, which detects the rotation number of the wire bobbin 31 in the predetermined detection cycle based on the pulse signals S1 and detects the rotation speed of the wire bobbin 31 based on the rotation number, is formed by the rotation number calculator 80.

In addition, when the wire electric discharge machining is performed, the encoder pulses S5 of the servo motor 21 are input into the speed detector 84. The speed detector 84 detects the delivery speed of the wire electrode 2 based on the encoder pulses S5, and outputs the wire delivery speed signals S6 representing the detected speed. The wire delivery speed signals S6 are also input into the winding diameter calculator 81. The winding diameter calculator 81 calculates the winding external diameter of the wire electrode 2 in the wire bobbin 31, i.e. the wire winding diameter R based on the wire delivery speed represented by the wire delivery speed signals S6 and the rotation speed of the wire bobbin 31 represented by the rotation speed signals S2. The calculation is performed, for example, by the following formula. Moreover, as one example, the wire delivery speed is set to about 10 m/min≈167 mm/s.

Wire winding diameter $R(mm)=$

Wire delivery speed$(mm/s)/\{\pi \cdot$rotation speed of wire bobbin(rotation number/$s$)$\}$     (1)

In this embodiment, the winding diameter calculation part, which calculates the winding diameter R of the wire electrode 2 in the wire bobbin 31 based on the rotation speed of the wire bobbin 31 detected by the rotation speed detection means and the delivery speed of the wire electrode 2 that is determined by the wire delivery means, is formed by the winding diameter calculator 81. The winding diameter calculator 81 outputs the winding diameter signals S3 obtained in the above mentioned way and representing the wire winding diameter R, and the winding diameter signals S3 are input into the wire calculator 82. The wire calculator 82 calculates the wire residual quantity S on the wire bobbin 31 based on the wire winding diameter R represented by the winding diameter signals S3, and the relationship between the wire winding diameter R and the wire residual quantity S in each specification of the wire bobbin 31 and the wire electrode 2 which is stored in the storage part 86.

That is, based on the specifications of the wire bobbin 31 and the wire electrode 2 which are input into the input part 85 before starting the wire electric discharge machining, the wire calculator 82 reads out from the storage part 86 the relationship between the wire winding diameter R and the wire residual quantity S which is stored in the storage part 86 corresponding to the specification, and fetches signals S8 representing this relationship. Then, the wire calculator 82 applies the wire winding diameter R represented by the winding diameter signals S3 to the wire winding diameter R in the relationship to calculate the wire residual quantity S. The wire calculator 82 outputs the wire residual quantity signals S4 representing the calculated wire residual quantity S, and the wire residual quantity signals S4 are input into the display device 83. The display device 83 consisting of, for example, a liquid crystal display device and the like displays the wire residual quantity S represented by the wire residual quantity signals S4 on a display screen. An operator or the like who is performing the wire electric discharge machining can observe the display of the display device 83 to know how long is the wire electrode 2 remaining in the wire bobbin 31. In this embodiment, the wire residual quantity calculation part, which uses the relationship stored in the storage part 86 corresponding to the specification input in the input part 85 and applies the winding diameter R of the wire electrode 2 calculated by the winding diameter calculation part to the winding diameter R of the wire electrode 2 which forms the relationship to calculate the residual quantity S of the wire electrode 2, is formed by the wire calculator 82.

As described above, according to the wire residual quantity detection device used in this embodiment, because the relationship between the actually measured wire winding diameter R and the wire residual quantity S is used to calculate the wire residual quantity S, the wire residual quantity S on the wire bobbin 31 can be calculated at a high accuracy.

Moreover, in the display device 83 shown in FIG. 2, the wire residual quantity S may be displayed merely in the form of the length of the wire electrode 2 remaining in the wire bobbin 31. Elsewise, the wire electric discharge machining time considered to last thereafter may be calculated from the length of the remaining wire electrode 2 and the wire delivery speed detected by the speed detector 84, and the machining time is displayed in the display device 83 as the wire residual quantity S. Furthermore, this type of machining time and the length of the wire electrode 2 remaining in the wire bobbin 31 may be displayed in the display device 83 together.

Here, description is made about the situation that the relationship between the wire winding diameter R and the wire residual quantity S as shown in FIG. 5 is calculated by those actually measured values. When the relationship is calculated for the wire bobbin 31 of a certain specification, the wire bobbin 31 of which the total winding length of the wire electrode 2 is precisely known is prepared. Then, although the wire electric discharge machining is not performed, the wire electrode 2 is drawn by the driving roller 22 from the wire bobbin 31 at the same time of the wire electric discharge machining. At this time, in the way similar to the one described above, the speed detector 84 outputs the wire delivery speed signals S6 representing the delivery speed of the wire electrode 2 based on the encoder pulses S5 of the servo motor 21.

The wire delivery speed signals S6 are input into the length measuring instrument 87, and the length measuring instrument 87 calculates the length of the wire electrode 2 drawn from the wire bobbin 31 by, for example, integrating the wire delivery speed signals S6 for calculation, or by cumulatively recording the wire delivery speed signals S6 to directly calculate the length from the rotation number of the delivery roller 20. Then, the length measuring instrument 87 calculates the wire residual quantity S remaining in the wire bobbin 31 by subtracting the length of the wire electrode 2 that is drawn out from the total winding length of the wire electrode 2. In addition, similar to the time of the wire electric discharge machining, the winding diameter signals S3 output by the winding diameter calculator 81 are input into the length measuring instrument 87. The length measuring instrument 87 samples signals representing the wire residual quantity S and the winding diameter signals S3 at proper time intervals to calculate the relationship between the wire winding diameter R and the wire residual quantity S, signals S9 representing this relationship are input into the storage part 86. This relationship is stored in the storage part 86 corresponding to the specifications of the wire bobbin 31 and the wire electrode 2 used to calculate this relationship. In this embodiment, the length measuring instrument 87 forms a wire length measuring means which detects the length of the drawn wire electrode 2 based on the delivery speed when the wire electrode 2 with a known total winding length is drawn by the wire delivery means from the wire bobbin 31, subtracts the drawn length from the total winding length to calculate the residual quantity S of the wire electrode 2, and outputs the residual quantity S of the wire electrode 2 along with the winding diameter R of the wire electrode 2 input from the winding diameter calculation part to the storage part 86 at predetermined sampling intervals.

Moreover, the relationship α and β between the wire winding diameter R and the wire residual quantity S in FIG. 5 are calculated in two cases in which the specifications of the wire bobbin 31 and the wire electrode 2 are mutually different. When the specifications of the wire bobbin 31 and the wire electrode 2 are fixed, basically only one relationship is obtained.

However, even when the specifications are fixed, if the actual measurement of the wire winding diameter R and the wire residual quantity S is performed for plural times, a plurality of relationships between the wire winding diameter R and the wire residual quantity S may be obtained due to errors in the actual measurement. In such cases, an average relationship may be obtained from the plurality of relationships and stored in the storage part 86. Elsewise, one relationship may be selected from the plurality of relationships and stored in the storage part 86. However, as long as the remaining length of the wire electrode 2 is not detect directly, errors in calculation cannot be avoided, the wire residual quantity S ought to be estimated anyway in consideration of safety, and thus in fact the errors in the actual measurement do not matter much. That is, although the requirements differ for wire bobbin products of different qualities, there is little necessity to use a plurality of wire bobbins 31 to register data for compensating the calculated value of the wire residual quantity S. Instead, even when the actually measured values of multiple wire bobbins 31 are accumulated, the uncertainty of the calculated wire residual quantity S still cannot be reduced and the burden of the operation that uses data is increased, only leading to the consumption of more wire electrode 2, and thus it is desirable that only the data of one roll of wire bobbin 31 is registered.

In a case that the selected one relationship is stored in the storage part 86 as mentioned above, the following points are to be noted. In the following, the relationship α and β in FIG. 5 is used as examples for description. Before the wire bobbin 31 is used, the wire residual quantity S on the wire bobbin 31 is set to S0 and the wire winding diameter R set to R0. Besides, the wire residual quantity S on the wire bobbin 31 when the minimum value of the wire winding diameter is reduced to R1 is set to S1 in the case that the relationship α is selected and is set to S2 when the relationship β is selected. Then, when the wire residual quantity S reaches a quite low set value, the wire electric discharge machining operation should be temporarily interrupted to replace the wire bobbin 31 that is winding and holding the wire electrode 2 with a new one.

Although the specifications of the wire bobbin 31 and the wire electrode 2 are fixed, when two relationships, namely α and β are obtained, there is high possibility that the actual relationship is a middle relationship between α and β. Under this fact, the wire residual quantity S when the wire winding diameter R is a value close to the minimum value R1 is smaller than the actual wire residual quantity S in the case that the relationship α is selected, and is greater than the actual wire residual quantity S in the case that the relationship β is selected. Therefore, when safety is emphasized to avoid the situation that the wire electric discharge machining operation is still performed without replacing the wire bobbin 31 when the residual quantity S of the wire electrode 2 on the wire bobbin 31 becomes 0 (zero), the relationship in which the wire residual quantity S is estimated to be less with respect to the wire winding diameter R, i.e. the relationship α in the example is selected, for example.

Moreover, in this embodiment, the speed actually measured by the speed detector 84 is used as the wire delivery speed for the winding diameter calculator 81 in FIG. 2 to calculate the wire winding diameter R. However, when the wire delivery speed is input as one machining condition (parameter) from the input part 85 or the control part of the wire electric discharge machining device for example, the input value may be directly used as the wire delivery speed.

In this embodiment, the emptiness determination device 88 shown in FIG. 2 is used to detect the empty state of the wire bobbin 31 during the wire electric discharge machining, i.e. the state that there is no wire electrode 2 left at all. In the following, the empty state detection is described.

Figure 6:
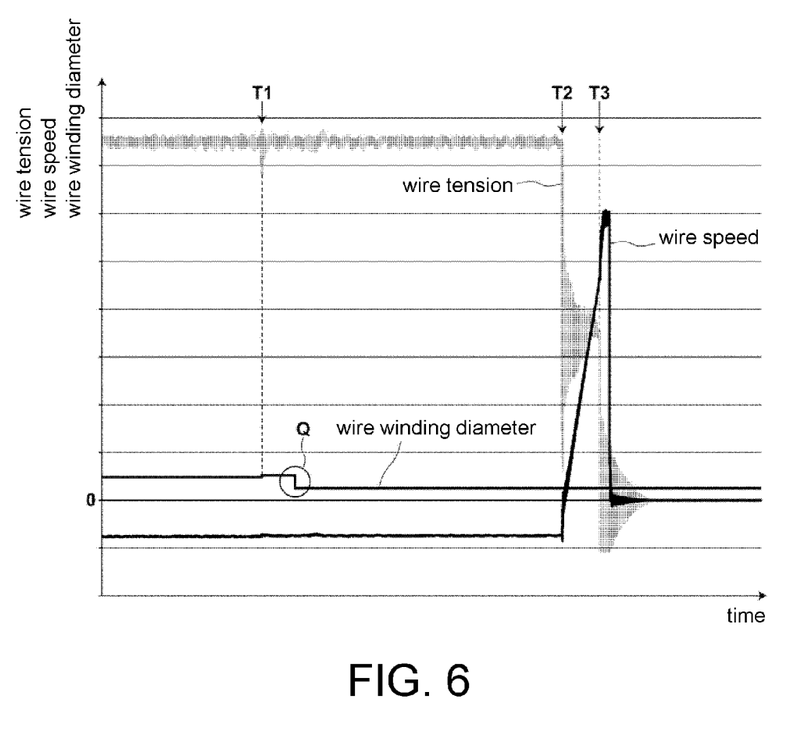
FIG. 6 is a graph showing changes with the lapse of time of a wire tension, a wire speed and a wire winding diameter in the wire electric discharge machining device.

FIG. 6 is a graph which shows changes with the lapse of time of the wire winding diameter R represented by the winding diameter signals S3 which are output by the winding diameter calculator 81 in FIG. 2, the wire delivery speed (wire speed) represented by the wire delivery speed signals S6 which are output by the speed detector 84 in the same FIG. 2, and the tension of the wire electrode 2 (wire tension) detected by the tension detector 35 in FIG. 1. The winding diameter signals S3 and the rotation speed signals S2 which are output by the rotation number calculator 80 are input into the emptiness determination device 88.

In the wire electric discharge machining device, the wire electrode 2 has to be arranged in a tense state in the machining clearance of the work-piece 3. Therefore, usually, a means for clamping the wire electrode 2 is arranged which consists of the delivery roller 20 also used as a tension roller and the winding roller 73 which are shown in FIG. 1. On the other hand, because the brake motor 40 as described above is combined with the reel 32 in which the wire bobbin 31 is loaded, a predetermined back tension is applied to the wire electrode 2 between the wire bobbin 31 and the delivery roller 20. Because the wire electrode 2 moving from the reel 32 to the winding roller 73 vibrates slightly, for example, as shown in the range in FIG. 6 from time 0 to T1, the tension detected by the tension detector 35 contains minor vibration component, and a certain tension is probably generated in the wire electrode 2 in the machining clearance.

Here, if the wire bobbin 31 reaches the empty state, i.e. the state that no wire electrode 2 is wound in time T1 shown in FIG. 6, next, a rapid change of decreasing is generated in the wire winding diameter R as shown by a circle denoted by a symbol "Q" in the same graph. This is described in detail below. When a far end of the wire electrode 2 wound and held in the wire bobbin 31 is separated from the wire bobbin 31 in the time T1, because of the brake motor 40, a force in the backward direction of the rotation direction (forward direction) during the drawing of the wire electrode 2 acts on the wire bobbin 31, and thus the wire bobbin 31 stops rotating momentarily and then rotates in the backward direction.

Figure 7:
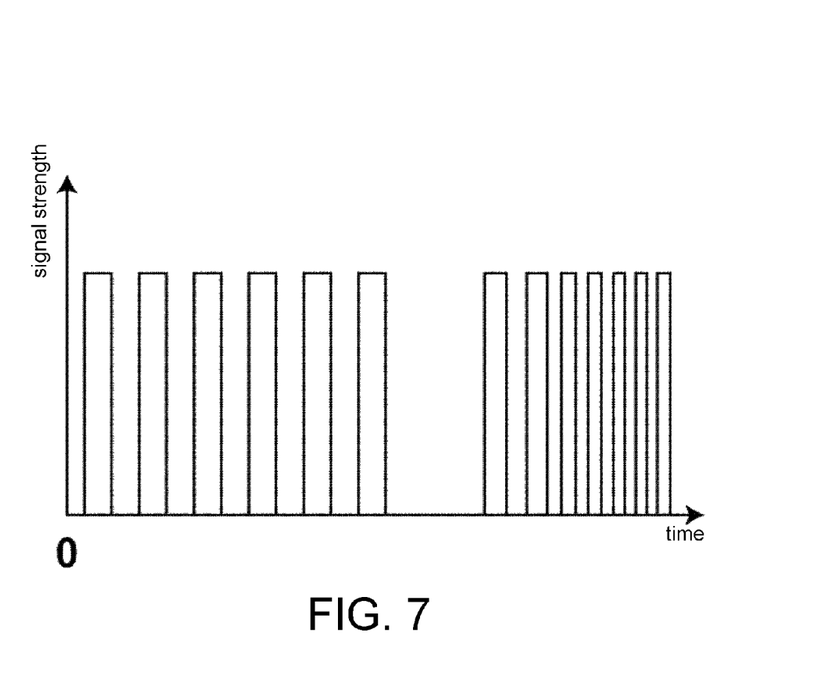
FIG. 7 is a graph showing a waveform of pulse signals emitted by a proximity sensor in the wire electric discharge machining device.

The waveform of the pulse signals S1 from the proximity sensor 38 at this time is shown in FIG. 7. As shown in the graph, the pulse signals S1 do not rise in the period in which the wire bobbin 31 momentarily stops rotating as described above, and rise again after the period with the backward-direction rotation of the wire bobbin 31 caused by the brake motor 40. In this example, after an acceleration period, the backward-direction rotation of the wire bobbin 31 has a speed higher than the rotation speed of the forward-direction rotation during the drawing of the wire electrode 2, and thus the pulse widths and cycles of the pulse signals S1 eventually become shorter than those in the period before the forward-direction rotation is stopped.

When the rotation of the wire bobbin 31 is stopped temporarily and the number of the pulse signals S1 in a predetermined calculation period is extremely small, the detected rotation speed of the wire bobbin rapidly and greatly slows down, so that the calculated wire winding diameter R that is calculated with the delivery speed of the delivery roller 20 and the rotation speed of the wire bobbin 31 increase for one time. In the embodiment, because the wire winding diameter R is calculated in a predetermined calculation cycle of about one second to several seconds in practice, in moment T1 in the graph shown in FIG. 6, a slight increase in the wire winding diameter R is seen; if the calculation cycle is shortened to the limit, the rotation speed of the wire bobbin 31 in the calculation period when the wire bobbin 31 momentarily stops rotating is extremely close to 0, and thus the increase in the wire winding diameter R in the graph of FIG. 6 is more clearly shown. When the wire bobbin 31 starts the backward rotation immediately after that because of the braking force and the rotation number increases, the detected rotation speed of the wire bobbin 31 increases and the wire winding diameter R is calculated to be drastically reduced.

Because the predetermined calculation cycle is from one second to several seconds, when the generation degree of the pulse signals S in FIG. 7 is checked, a step is generated in the line representing the wire winding diameter R at point Q which is a little while after the moment T1 shown in FIG. 6. Therefore, the rapid decrease in the wire winding diameter R shown in FIG. 6 is caused by the high-speed backward rotation immediately after the wire bobbin 31 momentarily stops rotating. Then, the transition to relatively low values following this rapid decrease is caused as the backward rotation of the wire bobbin 31 transfers to a fixed speed.

When the emptiness determination device 88 detects the rapid decrease in the wire winding diameter R from the input winding diameter signals S3, a determination is made that the wire bobbin 31 reaches the empty state. Specifically, for example, by constantly comparing the wire winding diameter R newly calculated in each calculation cycle of one second to several seconds with the wire winding diameter R calculated previously, the increase in the wire winding diameter R at the moment T1 and the decrease in the wire winding diameter R at the point Q after that can be detected. More specifically, when the wire winding diameter R calculated later is larger than the wire winding diameter R calculated previously, a determination can be made that the wire electrode 2 is gone in the wire bobbin 31 at the moment T1 and the wire bobbin 31 stops rotating momentarily, and after the latter calculation period, the wire bobbin already starts the backward rotation at a high speed exceeding the normal rotation speed, so that the decrease in the wire winding diameter R can be detected from the rapid increase in the pulse signals S1. When the determination that the wire bobbin 31 reaches the empty state is made based only on the rapid decrease in the wire winding diameter R, for example, when the difference between the wire winding diameter R calculated previously and the wire winding diameter R calculated later changes greatly enough to exceed a predetermined threshold, it can be regarded as a "rapid decrease". When it is taken into consideration that, for example, the wire winding diameter R should not decrease by an amount exceeding the diameter of the wire electrode in a short period of the former and latter calculation periods, the threshold, in the form of the difference between the wire winding diameters R, is set to about 1.5 to 2 times of the diameter of the wire electrode. When the emptiness determination device 88 makes this determination, the bobbin emptiness signals S7 representing that the wire bobbin 31 reaches the empty state are input into the motor control device 89. On receiving the bobbin emptiness signals S7, the motor control device 89 delivers control signals S10 which instruct to stop driving to the servo motor 21, and the rotation of the servo motor 21, i.e. the rotation of the driving roller 22 is stopped. In this embodiment, the drive control part, which stops the driving of the wire delivery means when the emptiness determination means determines that the wire bobbin 31 reaches the empty state, is formed by the motor control device 89.

The wire tension and wire speed (substantial delivery speed) shown in FIG. 6 exhibit the change in the case that the rotation of the driving roller 22 is continued even after the wire bobbin 31 reaches the empty state as described above. In this case, the time for the far end of the wire electrode 2 which is separated from the wire bobbin 31 to reach the space between the driving roller 22 and the pinch roller 23 is set to T2, and the time for the far end of the wire electrode 2 to reach the space between the driving roller 22 and the pinch roller 24 (see FIG. 1) is set to T3.

The wire tension as shown in this graph decrease greatly when the far end of the wire electrode 2 passes through the space between the driving roller 22 and the pinch roller 23, and goes on to decrease greatly when the far end goes on to pass through the space between the driving roller 22 and the pinch roller 24. On the other hand, when the far end of the wire electrode 2 passes through the space between the driving roller 22 and the pinch roller 23, the wire speed greatly increases because these rollers do not clamp (the wire tension is actually about to be raised to the predetermined wire tension and the rotation number of the driving roller 22 increases), and when the far end goes on to pass through the space between the driving roller 22 and the pinch roller 24, the delivery force is lost and the wire speed greatly decrease and substantially becomes 0 (the wire tension is actually lower than the threshold to detect wire disconnection, and thus the control of the driving roller 22 is stopped).

When the wire electrode 2 is supplied at the delivery speed set in the common wire electric discharge machining, at least about five seconds are required from the far end of the wire electrode 2 to reach the space between the driving roller 22 and the pinch roller 23 after getting away from the wire bobbin 31. On the other hand, the time required for the rotation of the servo motor 21 to be stopped by the control signals S10 output by the motor control device 89 after the emptiness determination device 88 determines the empty state of the wire bobbin 31 is evidently shorter than about five seconds. Therefore, if the rotation of the servo motor 21 is stopped as described above, the part before the far end of the wire electrode 2 is clamped by the driving roller 22 and the pinch roller 23, and the far end can be prevented from entering the machining clearance of the work-piece. Therefore, the damage caused by the far end of the wire electrode 2 to the machining surface of the work-piece can be prevented. Besides, the wire bobbin 31 is replaced with a new one after reaching the empty state, and thus the situation that the wire electrode 2 is left in the wire bobbin 31 and becomes wasted can also be prevented.

The emptiness determination device 88 in the embodiment described above detects the rapid change in the rotation speed of the wire bobbin 31 from the rapid change in the winding diameter R of the wire electrode 2 calculated by the winding diameter calculator 81. However, the emptiness determination device 88 is not limited thereto and may be configured to directly use the rotation speed signals S2 output by the rotation number calculator 80 to detect the rapid change in the rotation speed of the wire bobbin 31.

In this case, if the rotation speed signals S2 represent the rotation speed of the wire bobbin 31 while distinguishing the rotation direction, the rapid change in the rotation speed may be detected, for example, by comparing the absolute value of the rotation speed with the aforementioned threshold. In addition, when the rotation speed signals S2 represent the rotation speed of the wire bobbin 31 while distinguishing the rotation direction, the inversion of the rotation direction may be detected as the rapid change in the rotation speed.

Besides, even in the case that the rotation speed signals S2 output by the rotation number calculator 80 are directly used to detect the rapid change in the rotation speed of the wire bobbin 31, the rotation speed signals S2 can also represent the rotation speed of the wire bobbin 31 by magnitude only (that is, the rotation direction is neglected). Similar to the case in which the rapid change in the winding diameter R of the wire electrode 2 is used, in this case, a positive threshold is similarly set for the positive rotation speed, and the rapid change in the rotation speed of the wire bobbin 31 can be detected by detecting that the rotation speed exceeds the threshold.

In this embodiment, the emptiness determination device 88 forms the emptiness determination means, which determines that the wire bobbin 31 reaches the empty state based on the rapid change in the rotation speed of the wire bobbin detected by the rotation speed detection means. In this embodiment, the emptiness determination device 88 may form the emptiness determination means, which detects the rapid change in the rotation speed of the wire bobbin 31 from the rapid change in the winding diameter R of the wire electrode 2 calculated by the winding diameter calculation part to determine that the wire bobbin 31 reaches the empty state. In this embodiment, the emptiness determination device 88 may form the emptiness determination means, which detects the rapid change in the rotation speed of the wire bobbin 31 from the rapid change in the rotation speed signals S2 representing the rotation speed of the wire bobbin 31 output by the rotation speed detection means to determine that the wire bobbin 31 reaches the empty state. In this embodiment, the emptiness determination device 88 may form the emptiness determination means, which detects the rapid change in the rotation speed of the wire bobbin 31 by the inversion of the rotation direction of the wire bobbin 31 detected by the rotation speed detection means to determine that the wire bobbin 31 reaches the empty state.

The embodiment was chosen in order to explain the principles of the disclosure and its practical application. Many modifications and variations are possible in light of the above teachings. It is intended that the scope of the disclosure be defined by the claims.

The embodiments of the disclosure provide a wire electric discharge machining device. According to this wire electric discharge machining device, the empty state of the wire bobbin is quickly detected, the delivery of the wire electrode is quickly stopped, and the rear end of the wire electrode can be prevented from entering the machining clearance of the work-piece. Furthermore, it can be prevented that the rear end of the wire electrode passes through a means that applies a tension to the wire electrode and causes a decrease in the tension applied to the wire electrode compared with the tension during the machining and a slight shaking of the wire electrode. Besides, the waste of the wire electrode can be reduced as much as possible. Additional objects and advantages of the invention will be set forth in the description that follows.

In an exemplary embodiment of the disclosure, a winding diameter calculation part is further arranged which performs an operation of a winding diameter of the wire electrode in the wire bobbin based on the rotation speed of the wire bobbin detected by the rotation speed detection means and a delivery speed of the wire electrode determined by the wire delivery means, and the emptiness determination means is configured to indirectly detect the rapid change in the rotation speed of the wire bobbin based on the rapid change in the winding diameter of the wire electrode calculated by the winding diameter calculation part.

However, the emptiness determination means is not limited thereto and may be configured to directly detect the rapid change in the rotation speed of the wire bobbin based on a signal showing the rotation speed.

According to the wire electric discharge machining device of one or some exemplary embodiments of the disclosure, after it is quickly detected that the wire bobbin reaches an empty state, the drive of the wire delivery means is stopped quickly. Therefore, the rear end of the wire electrode is prevented from entering a machining clearance of the work-piece. Furthermore, it is prevented that the rear end of the wire electrode passes through the means that applies a tension to the wire electrode and causes a decrease in the tension applied to the wire electrode compared with the tension during the machining and a slight shaking of the wire electrode. Besides, no wire electrode is left in the wire bobbin replaced by a new one and the waste of the wire electrode is prevented.

What is claimed is:

1. A wire electric discharge machining device, comprising:
    a wire bobbin configured to wind and hold a wire electrode, a wire delivery means configured to draw the wire electrode from the wire bobbin and deliver the wire electrode continuously toward a work-piece, and a load applying means configured to apply a load to the wire bobbin in a direction against the drawing of the wire electrode, wherein the wire electric discharge machining device further comprising:
    a rotation speed detection means configured to detect a rotation speed of the wire bobbin;
    an emptiness determination means configured to determine that the wire bobbin reaches an empty state based on a rapid change in the rotation speed of the wire bobbin detected by the rotation speed detection means; and
    a drive control part configured to stop the drive of the wire delivery means when the emptiness determination means determines that the wire bobbin reaches the empty state.

2. The wire electric discharge machining device according to claim 1, wherein
    the rapid change in the rotation speed is the change in the rotation speed at the time the wire bobbin starts a backward rotation after the rotation of the wire bobbin is stopped and the rotation number increases when the wire delivery means delivers the wire electrode.

3. The wire electric discharge machining device according to claim 1, wherein
    a winding diameter calculation part is further arranged which calculates a winding diameter of the wire electrode in the wire bobbin based on the rotation speed detected by the rotation speed detection means and a delivery speed of the wire electrode determined by the wire delivery means, and
    the emptiness determination means detects the rapid change in the rotation speed from a rapid change in the winding diameter calculated by the winding diameter calculation part.

4. The wire electric discharge machining device according to claim 3, wherein
    the rapid change in the winding diameter calculated by the winding diameter calculation part is a situation in which the winding diameter is calculated in each calculation cycle and the difference between the winding diameter calculated previously and the winding diameter calculated later greatly changes and exceeds a predetermined threshold.

5. The wire electric discharge machining device according to claim 4, wherein
    the predetermined threshold is 1.5 to 2 times the size of the diameter of the wire electrode.

6. The wire electric discharge machining device according to claim 1, wherein
    the rotation speed detection means comprises: a proximity sensor detection plate which rotates along with the wire bobbin and on which a plurality of through holes are uniformly formed in a circumferential direction; a proximity sensor that is arranged at a position facing the plurality of through holes and outputs pulse signals every time the plurality of through holes passes through; and a rotation number calculation part that detects the rotation number of the wire bobbin in a predetermined detection cycle based on the pulse signals and detects the rotation speed based on the rotation number.

7. The wire electric discharge machining device according to claim 1, wherein
    the rotation speed detection means detects the rotation speed and rotation direction of the wire bobbin, and
    the emptiness determination means detects the rapid change in the rotation speed from an inversion of the rotation direction detected by the rotation speed detection means.

* * * * *